United States Patent
Royak et al.

(10) Patent No.: US 6,703,809 B2
(45) Date of Patent: Mar. 9, 2004

(54) FLUX POSITION IDENTIFIER USING HIGH FREQUENCY INJECTION WITH THE PRESENCE OF A RICH HARMONIC SPECTRUM IN A RESPONDING SIGNAL

(75) Inventors: Semyon Royak, Beachwood, OH (US); Russel J. Kerkman, Milwaukee, WI (US); Mark M. Harbaugh, Richfield, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 121 days.

(21) Appl. No.: 10/092,046

(22) Filed: Mar. 5, 2002

(65) Prior Publication Data

US 2003/0169015 A1 Sep. 11, 2003

(51) Int. Cl.$^7$ ................................................. H02P 1/24
(52) U.S. Cl. ........................ 318/727; 318/799; 318/802; 318/811
(58) Field of Search ................................. 318/684, 727, 318/767, 798–802, 805–812

(56) References Cited

U.S. PATENT DOCUMENTS

| | | | |
|---|---|---|---|
| 5,559,419 A | | 9/1996 | Jansen et al. |
| 5,585,709 A | * | 12/1996 | Jansen et al. ................ 318/807 |
| 5,886,498 A | * | 3/1999 | Sul et al. ..................... 318/821 |
| 5,905,644 A | * | 5/1999 | Blasko et al. .................. 363/41 |
| 6,014,006 A | * | 1/2000 | Stuntz et al. ................ 318/804 |
| 6,069,467 A | * | 5/2000 | Jansen ......................... 318/802 |

OTHER PUBLICATIONS

Using Multiple Saliencies for the Estimatin of Flux, Position, and Velocity in AC Machines, IEEE Transaction of Industry Applications, vol. 34, No. 5, Sep./Oct. 1998, Michael W Degner et al.

A New Zero Frequency Flux Position Detection Approach For Direct Field Oriented Control Drives, 1999 IEEE, pp. 22902297. Consoli, et al.

Sensorless Field Oriented Control Using Common Mode Currents, 2000, Consoli, et al.

Air–Gap Flux Position Estimation of Inaccessibel Neutral Induction Machines by Zero Sequence Voltage, 2000, Consoli, et al.

Sensorless Field Orientatin Control of an Inductin Machine by High Frequency Signal Injection, 1997 IEEE, pp. 426–432, Ha, et al.

* cited by examiner

*Primary Examiner*—Rina I. Duda
(74) *Attorney, Agent, or Firm*—Quarles & Brady LLP; Alexander M. Gerasimow; William R. Walbrun

(57) ABSTRACT

A method and apparatus for estimating flux angle position in an induction machine, the method including the steps of providing high frequency injection voltage signals to a three-phase motor, obtaining frequency feedback signals from machine supply lines, converting the feedback signals to two-phase stationary high frequency signals, converting the stationary signals to synchronous signals using a high frequency angle estimate, negating one of the resulting synchronous signals, stepping up the negated signal to generate a low frequency spectrum signal, adding the low frequency spectrum signal and the high frequency injection signal to generate a combined spectrum signal and integrating the combined spectrum signal to generate the high frequency angle estimate, dividing the low frequency spectrum by a system specific DHN to generate a stator frequency estimate and integrating the stator frequency estimate to generate the flux angle estimate.

22 Claims, 8 Drawing Sheets

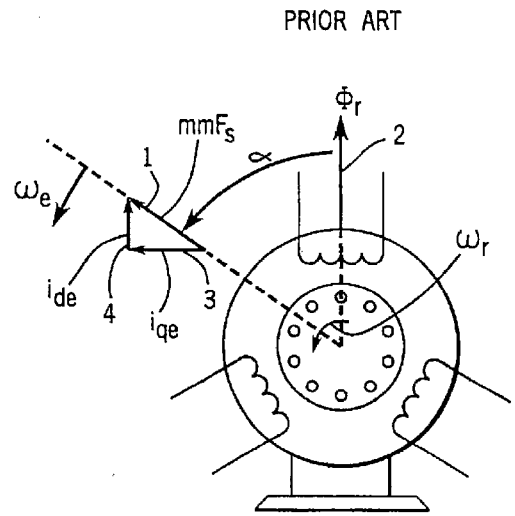
Fig. 1
Prior Art
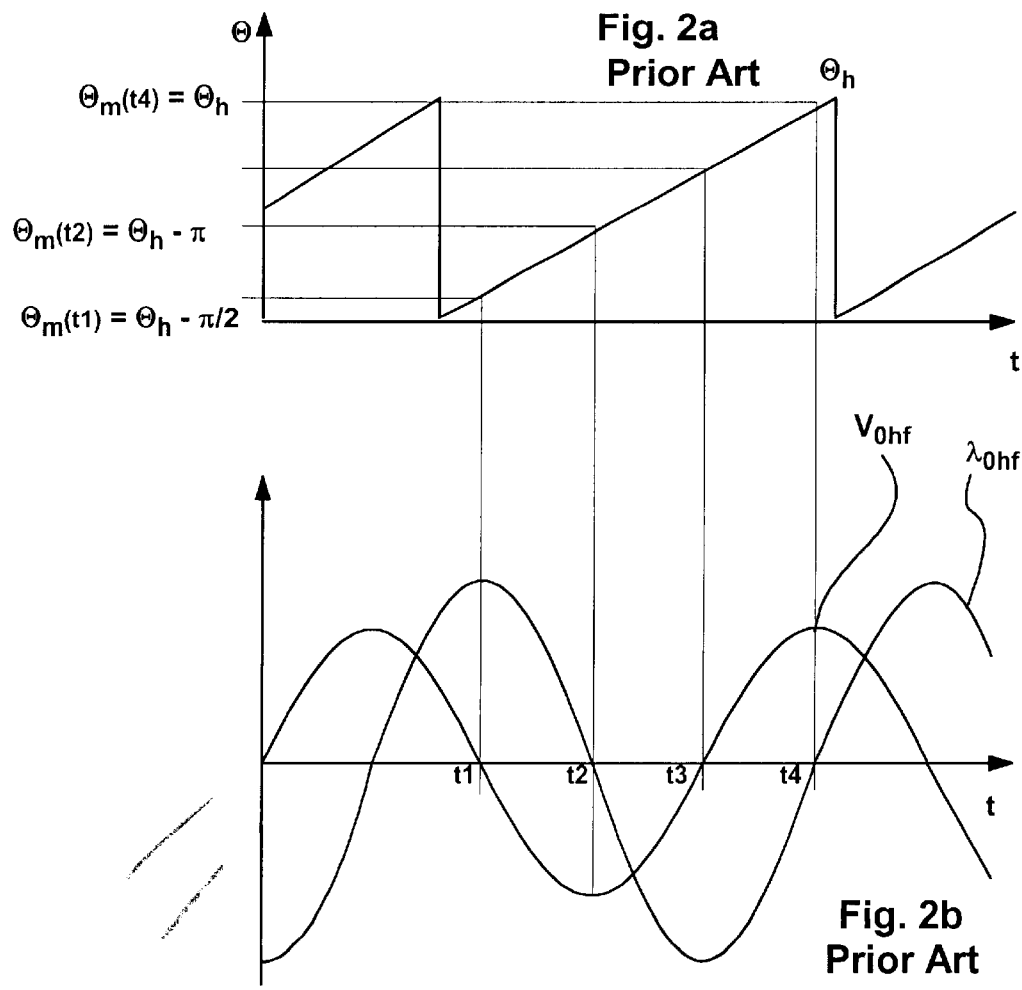
Fig. 2a
Prior Art
Fig. 2b
Prior Art

FLUX POSITION IDENTIFIER USING HIGH FREQUENCY INJECTION WITH THE PRESENCE OF A RICH HARMONIC SPECTRUM IN A RESPONDING SIGNAL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is AC induction motor drives and more specifically the area of injecting high frequency voltage signals into an AC induction motor and using high frequency feedback signals to identify stator frequency and flux position.

Induction motors have broad application in industry, particularly when large horsepower is needed. In a three-phase induction motor, three phase alternating voltages are impressed across three separate motor stator windings and cause three phase currents therein. Because of inductances, the three currents typically lag the voltages by some phase angle. The three currents produce a rotating magnetic stator field. A rotor contained within the stator field experiences an induced current (hence the term "induction") which generates a rotor field. The rotor field typically lags the stator field by some phase angle. The rotor field is attracted to the rotating stator field and the interaction between the two fields causes the rotor to rotate.

A common rotor design includes a "squirrel cage winding" in which axial conductive bars are connected at either end by shorting rings to form a generally cylindrical structure. The flux of the stator field cutting across the conductive bars induces cyclic current flows through the bars and across the shorting rings. The cyclic current flows in turn produce the rotor field. The use of this induced current to generate the rotor field eliminates the need for slip rings or brushes to provide power to the rotor, making the design relatively maintenance free.

To a first approximation, the torque and speed of an induction motor may be controlled by changing the frequency of the driving voltage and thus the angular rate of the rotating stator field. Generally, for a given torque, increasing the stator field rate will increase the speed of the rotor (which follows the stator field). Alternatively, for a given rotor speed, increasing the frequency of the stator field will increase the torque by increasing the slip, that is the difference in speed between the rotor and the stator fields. An increase in slip increases the rate at which flux lines are cut by the rotor, increasing the rotor generated field and thus the force or torque between the rotor and stator fields.

Referring to FIG. 1, a rotating phasor 1 corresponding to a stator magneto motive force ("mmf") will generally have some angle α with respect to the phasor of rotor flux 2. The torque generated by the motor will be proportional to the magnitudes of these phasors 1 and 2 but also will be a function of their angle α. Maximum torque is produced when phasors 1 and 2 are at right angles to each other whereas zero torque is produced if the phasors are aligned. The stator mmf phasor 1 may therefore be usefully decomposed into a torque producing component 3 perpendicular to rotor flux phasor 2 and a flux component 4 parallel to rotor flux phasor 2.

These two components 3 and 4 of the stator mmf are proportional, respectively, to two stator current components: $i_q$, a torque producing current, and $i_d$, a flux producing current, which may be represented by quadrature or orthogonal vectors in a rotating or synchronous frame of reference (i.e., a reference frame that rotates along with the stator flux vector) and each vector $i_q$ and $i_d$ is characterized by slowly varying DC magnitude.

Accordingly, in controlling an induction motor, it is generally desired to control not only the frequency of the applied voltage (hence the speed of the rotation of the stator flux phasor 1), but also the phase of the applied voltage relative to the current flow and hence the division of the currents through the stator windings into the $i_q$ and $i_d$ components. Control strategies that attempt to independently control current components $i_q$ and $i_d$ are generally referred to as field oriented control strategies ("FOC").

Generally, it is desirable to design FOC strategies that are capable of driving motors of many different designs and varying sizes. Such versatility cuts down on research, development, and manufacturing costs and also results in easily serviceable controllers. Unfortunately, while versatile controllers are cost-effective, FOC controllers cannot control motor operation precisely unless they can adjust the division of d and q-axis currents through the stator windings to account for motor-specific operating parameters. For this reason, in order to increase motor operating precision, various feedback loops are typically employed to monitor stator winding currents and voltages and/or motor speed. A controller uses feedback information to determine how the inverter supplied voltage must be altered to compensate for system disturbances due to system specific and often dynamic operating parameters and then adjusts control signals to supply the desired inverter voltages.

To this end, in an exemplary FOC system, two phase d and q-axis command currents are provided that are calculated to control a motor in a desired fashion. The command currents are compared to d and q-axis motor feedback currents to generate error signals (i.e., the differences between the command and feedback currents). The error signals are then used to generate d and q-axis command voltage signals which are in turn transformed into three phase command voltage signals, one voltage signal for each of the three motor phases. The command voltage signals are used to drive a pulse width modulated (PWM) inverter that generates voltages on three motor supply lines. To provide the d and q-axis current feedback signals the system typically includes current sensors to sense the three phase line currents and a coordinate transformation block is used to transform the three phase currents to two phase synchronous dq frame of reference feedback currents.

In addition to requiring two phase signals and three phase signals to perform 2-to-3 and 3-to-2 phase transformations, respectively, a precise flux position angle estimate $\theta'_m$ is also required. One common way to generate a flux angle feedback estimate is to integrate a stator frequency. A stator frequency can be determined by adding a measured rotor frequency (rotor speed) and a calculated slip frequency. In the case of drives that do not include a rotor speed sensor, it is necessary to estimate both the rotor frequency and the slip frequency to determine the flux angle. Thus, these drives require precise knowledge of motor parameter values.

In an effort to reduce system costs and increase reliability, the controls industry has recently developed various types of sensorless or self-sensing induction machine systems that, as the labels imply, do not include dedicated speed sensing hardware and corresponding cabling but that, nevertheless, can generate accurate position, flux and velocity estimates. Techniques used for operating parameter estimation can be divided into two groups including techniques that track speed dependent phenomenon and techniques that track spatial saliencies in system signals. These techniques generally use disturbances in d and q-axis feedback currents to identify the operating parameters of interest and hence provide additional functionality which, in effect, "piggybacks" on feedback signals that are obtained for another purpose (i.e., dq current components are already required for FOC).

Because speed dependent techniques depend on speed in order to generate an identifiable feedback signal, these techniques ultimately fail at zero or low (e.g., below 5 Hz) excitation frequency due to lack of signal. In addition, because these methods estimate operating parameters from voltage and current, these techniques are sensitive to temperature varying system parameters such as stator resistance, etc.

One type of saliency tracking technique includes injecting or applying a known high frequency "injection" voltage signal in addition to each of the command voltage signals used to drive the PWM inverter and using feedback current (or voltage) signals to identify saliencies associated with the flux angle. To this end, an exemplary system converts a high frequency command signal into a high frequency phase angle and generates a first injection signal that is the product of a scalar and the sine of the high frequency phase angle. Second and third injection signals are also generated, each of the second and third signals phase shifted from the first signal by 120 degrees. A separate one of the first, second and third signals is then added to a separate one of the three voltage command signals that are used to drive the PWM inverter.

One injection type saliency tracking algorithm to generate a flux position angle estimate without a rotor speed sensor employs a negative sequence of the high frequency current component and is described in an article that issued in the IEEE Transactions on Industry Applications publication, vol. 34, No. 5, September/October 1998 by Robert Lorenz which is entitled "Using Multiple Saliencies For The Estimation Of Flux Position, And Velocity In AC Machines" (hereinafter "the Lorenz article"). The algorithm in the Lorenz article is based on the fact that when a high frequency voltage signal (referred to in the Lorenz article as a "carrier signal") is injected into a rotating system, a resulting high frequency field interacts with system saliency to produce a "carrier" signal current that contains information relating to the position of the saliency. The carrier current consists of both positive and negative-sequence components relative to the carrier signal voltage excitation. While the positive sequence component rotates in the same direction as the carrier signal voltage excitation and therefore contains no spatial information, the negative-sequence component contains spatial information in its phase. The Lorenz article teaches that the positive sequence component can be filtered off leaving only the negative-sequence component which can be fed to an observer used to extract flux angle position information.

Unfortunately, algorithms like the algorithm described in the Lorenz article only works well if an induction machine is characterized by a single sinusoidally distributed spatial saliency. As known in the art, in reality, motor currents exhibit more than a single spatial saliency in part due to the fact that PWM inverters produce a plethora of harmonics. As a result, the phase current negative sequence comprises a complicated spectrum that renders the method described in the Lorenz article relatively inaccurate.

Injection type saliency tracking algorithms employ a zero sequence high frequency current or voltage component instead of the negative sequence current component. One such technique is described in an article that issued in the IEEE IAS publication, pp. 2290–2297, Oct. 3–7, 1999, Phoenix Ariz., which is entitled "A New Zero Frequency Flux Position Detection Approach For Direct Field Orientation Control Drives" (hereinafter "the Conseli article"). The Conseli article teaches that the main field of an induction machine saturates during system operation which causes the spatial distribution of the air gap flux to assume a flattened sinusoidal waveform including all odd harmonics and dominated by the third harmonic of the fundamental. The third harmonic flux component linking the stator windings induces a third harmonic voltage component (i.e., a voltage zero sequence) that is always orthogonal to the flux component and that can therefore be used to determine the flux position. Unfortunately, the third harmonic frequency is low band width and therefore not particularly suitable for instantaneous position determination needed for low speed control.

The Conseli article further teaches that where a high frequency signal is injected into a rotating system, the injected signal produces a variation in the saturation level that depends on the relative positions of the main rotating field and high frequency rotating field. Due to the fundamental component of the main field, the impedance presented to the high frequency injected signal varies in space and this spatial variance results in an unbalanced impedance system. The unbalanced system produces, in addition to the fundamental zero sequence component of air gap flux and voltage, additional high frequency components having angular frequencies represented by the following equation:

$$\omega_{oh1} = \omega_h \pm \omega_1 \qquad \text{Eq. 1}$$

where:
  $\omega_{oh1}$=the high frequency voltage zero sequence component frequency;
  $\omega_h$=the high frequency injection signal frequency;
  $\omega_1$=fundamental stator frequency first harmonic frequency; and
where the sign "±" is negative if the high frequency "injected" signal has a direction that is the same as the fundamental field direction and is positive if the injected signal has a direction opposite the fundamental field direction.

In this case, referring to FIGS. 2a and 2b, a zero sequence air gap flux component $\lambda_{ohf}$ that results from the complex interaction of the zero sequence flux produced by the fundamental component and the impressed high frequency injected signals induce a zero sequence voltage component $V_{ohf}$ on the stator winding that always leads the zero sequence flux component $\lambda_{ohf}$ by 90°. The maximum zero sequence flux component $\lambda_{ohf}$ always occurs when the main and high frequency rotating fields are aligned and in phase and the minimum zero sequence flux component $\lambda_{ohf}$ always occurs when the main and high frequency rotating fields are aligned but in opposite phase. Thus, in theory, by tracking the zero crossing points of the high frequency zero sequence component $V_{ohf}$ and the instances when minimum and maximum values of the high frequency zero sequence voltage component $V_{ohf}$ occur, the position of the high frequency rotating field $\Theta_h$ can be used to determine the main air gap flux position $\Theta_m$.

For instance, referring to in FIGS. 2a and 2b, and also to FIGS. 9 and 10, at time t1 (see FIG. 9) when voltage $V_{ohf}$ is transitioning from positive to negative and crosses zero, the main field $F_m$ is in phase and aligned with the high frequency flux $\lambda_{ohf}$ (i.e., field $F_h$) which lags voltage $V_{ohf}$ by 90° and therefore main field angle $\Theta_m$ is $\Theta_h - \pi/2$ (where $\Theta_h$ is the high frequency injected signal angle). As indicated in FIG. 2b, at time t1 voltage $V_{ohf}$ has a zero value. Nevertheless, in FIG. 9 voltage $V_{ohf}$ is illustrated as having a magnitude so that angle $\Theta_h$ is illustrated as having a magnitude so that angle $\Theta_h$ can be illustrated. Similar comments are applicable to FIG. 10 and time t3.

At time t2 where voltage $V_{ohf}$ reaches a minimum value, the main field $F_m$ and flux $\lambda_{ohf}$ are in quadrature and therefore main field angle $\Theta_m$ can be expressed as $\Theta_h - \pi$ (i.e., 90° between signal $V_{ohf}$ and flux $\lambda_{ohf}$ and another 90° between flux $\lambda_{ohf}$ and main field $f_m$ for a total of $\pi$). At time t3 (see FIG. 10) where voltage $V_{ohf}$ is transitioning from negative to positive through zero, the main field is out of phase with flux $\lambda_{ohf}$ and therefore main field angle $\Theta_m$ can be expressed as $\Theta_h - 3\pi/2$. Similarly, at time t4 voltage $V_{ohf}$ reaches a maximum value with the main field $F_m$ and flux $\lambda_{ohf}$ (i.e., field $F_h$) again in quadrature and main field $F_m$ leading flux $\lambda_{ohf}$ and therefore main field angle $\Theta_m$ is equal to high frequency angel $\Theta_h$.

Unfortunately, as in the case of the negative current component signal employed by Lorenz, high frequency zero sequence feedback signals contain a complicated harmonic spectrum mostly due to the PWM technique employed where the spectrum can be represented by the following equations:

$$\omega_{oh1} = \pm \omega_h \pm \omega_1 \quad \text{Eq. 2}$$

$$\omega_{oh2} = \pm \omega_h \pm \omega_2 \quad \text{Eq. 3}$$

$$\omega_{oh4} = \pm \omega_h \pm \omega_4 \quad \text{Eq. 4}$$

$$\omega_{oh6} = \pm \omega_h \pm \omega_6, \text{ etc.} \quad \text{Eq. 5}$$

where:

$\omega_{oh1}$, $\omega_{oh2}$, $\omega_{oh4}$, etc., are components of a harmonic spectrum of a high frequency current (or voltage) zero sequence signal and $\omega_1$, $\omega_2$, $\omega_4$, etc., are the $1^{st}$, $2^{nd}$, $4^{th}$, etc harmonic frequencies of the fundamental stator frequency. The ± signs are determined according to the convention described above with respect to Equation 1. The complicated zero sequence spectrum renders the method described in the Conseli article relatively inaccurate.

In light of the shortcomings of existing sensorless control systems, it would be advantageous to have a relatively inexpensive and simple method and apparatus that generates an accurate flux position estimate for use in induction motor control systems without requiring a rotor speed sensor and that is preferably implemented in software.

BRIEF SUMMARY OF THE INVENTION

When a high frequency injection signal is injected into an induction based system which is operating at a stator fundamental frequency, the high frequency signal interacts with the stator field to generate a resulting high frequency current (and corresponding voltage) that has a complicated initial high frequency spectrum. Not surprisingly, the initial spectrum includes a component at the injection frequency as well as components (hereinafter "sideband components") at various frequencies within sidebands about the injection frequency that are caused by inverter harmonics as well as interaction between system saliencies and the injected signals. The sideband components are at frequencies equal to the injection frequency plus or minus multiples of the fundamental frequency. For instance, where the injection frequency is 500 Hz and the fundamental frequency is 2 Hz, the sideband components may include frequencies of 494 Hz, 496 Hz, 498 Hz, 502 Hz, 504 Hz, 506 Hz, etc.

In addition, it has been recognized that, given a specific motor control system configuration (i.e., specific hardware and programmed operation), a dominant sideband frequency has the largest amplitude. This dominant sideband frequency for the system configuration always corresponds to the sum of the injection frequency and a specific harmonic of the fundamental where the specific harmonic number is a function of system design and operating parameters. For instance, given a first system configuration, the system specific dominant sideband frequency may be the sum of the injection frequency and the 4th harmonic of the fundamental while, given a second system configuration, the system specific dominant sideband frequency may be the sum of the injection frequency and the 2nd harmonic of the fundamental frequency. The harmonic with the largest amplitude that is added to the injection frequency to obtain the dynamic sideband frequency corresponding to a specific system is referred to hereinafter as the system specific dominant harmonic number (DHN). For instance, in the two examples above the system specific DHNs are $4^{th}$ and $2^{nd}$, respectively.

Moreover, it has been recognized that during a commissioning procedure, the system specific DHN can be determined using a FFT analysis or using a spectrum analyzer or some other similar type of device. Thus, in the case of the first and second exemplary systems above, the 4th and 2nd harmonics would be identified, respectively, as corresponding system specific DHNs.

In light of the above realizations, the present invention has been designed to strip the injection frequency value out of each initial spectrum frequency thereby generating a low frequency spectrum including a separate frequency corresponding to each of the initial spectrum frequencies. For instance, in the above example where the fundamental and injection frequencies are 2 Hz and 500 Hz, respectively, and assuming sideband frequencies within the initial spectrum at 494 Hz, 496 Hz, 498 Hz, 502 Hz, 504 Hz and 506 Hz, after stripping, the low frequency spectrum includes modified sideband frequencies at −6 Hz, −4 Hz, −2 Hz, 2 Hz, 4 Hz and 6 Hz.

After the low frequency spectrum value has been generated, the low frequency spectrum value is mathematically combined with the system specific DHN and the resulting combination is the stator frequency value (i.e., the fundamental frequency). More specifically, the low frequency spectrum value is divided by the system specific DHN thereby generating a modified frequency spectrum where the dominant frequency value is the fundamental frequency (i.e., fundamental frequency value has the largest amplitude).

More specifically, at least one embodiment of the invention filters out the positive sequence components of the high frequency feedback currents and generates stationary high frequency α and β-axis negative-sequence components. These stationary components are orthogonal and together include the noisy initial spectrum about the high injection frequency.

As well known in the art, in the case of any stationary to synchronous component signal conversion, an angle that corresponds to the rotating components must be known. Where the angle is accurate, the resulting synchronous d and q-axis components are essentially DC values. However, where the angle is inaccurate, the resulting components fluctuate and the resulting d and q-axis components are not completely synchronous.

In the exemplary embodiment of the invention, a phase locked loop (PLL) adaptively generates a high frequency angle estimate that includes components corresponding to all high frequencies in the stationary α and β-axis negative sequence components. The angle estimate is used to convert the stationary high frequency α and β-axis negative-sequence components to synchronous d and q-axis negative-sequence components. Thereafter, one of the d or q-axis components is negated and the resulting negated or difference value is fed to a PI controller or the like to step up the difference value and generate the low frequency spectrum.

The angle estimate is adaptively generated by adding the high injection frequency and the low frequency spectrum to generate a combined frequency spectrum and then integrating the combined frequency spectrum. Thus, the angle estimate is accurate when the combined frequency spectrum matches the actual frequency spectrum that exists in the stationary α and β-axis negative sequence components and, where there is a difference between the combined frequency spectrum and the stationary α and β-axis components, that difference is reflected in the synchronous d and q-axis components which adaptively drive the PI regulator and adjusts the low frequency spectrum.

The low frequency spectrum is combined mathematically with the system specific dominant harmonic number to generate a stator fundamental frequency estimate. After the stator frequency is identified, the stator frequency can be integrated to generate an air gap flux angle estimate $\Theta_m$ and other operating parameters of interest in control systems.

Thus, it should be appreciated that the present invention provides a simple solution for quickly identifying an accurate stator frequency estimate despite a harmonic feedback signal. The solution described here is inexpensive and can be implemented in software and performed using conventional control system hardware.

According to another embodiment of the invention, instead of employing the three phase feedback currents to identify the complex frequency spectrum, a zero sequence voltage signal may be employed. To this end, unlike the case where the high frequency current is resolved into quadrature d and q-axis components, the zero sequence embodiment includes a feedback loop that only senses and feeds back a single common mode component. Nevertheless, to drive a PLL it is advantageous to regulate quadrature signal sets.

With the zero sequence voltage feedback signal being a stationary α-axis signal, an artificial stationary β-axis signal can be generated by integrating the α-axis signal to generate an integrated signal, low pass filtering the integrated signal to generate a filtered signal and subtracting the filtered signal from the integrated signal thereby providing the high frequency component of the integrated signal as the β-axis signal. Consistent with the high frequency current example described above, after the α and artificial β-axis components are generated, the stationary α and β-axis signals are converted to synchronous high frequency d and q-axis signals and one of the d or q-axis signals is used to drive the PLL. Operation of the PLL in this embodiment is similar to operation of the embodiment described above.

Yet one other embodiment of the invention includes substituting a current zero sequence feedback loop for the voltage zero sequence feedback loop but operates in the same fashion as described above (i.e., generates an artificial stationary β-axis component to drive the PLL along with the zero sequence current component as the α-axis component).

More specifically, the invention includes a method for determining a stator fundamental operating frequency in a three phase induction machine where the machine is characterized by a system specific dominant harmonic frequency number. Here, the method comprising the steps of injecting a high frequency voltage signal having a high frequency into the machine thereby generating a high frequency current within the stator windings, identifying stationary two phase high frequency feedback signal components that includes stator field position information, identifying a low frequency spectrum corresponding to the feedback signal components, mathematically combining the low frequency spectrum and the system specific dominant harmonic number to generate a stator fundamental frequency estimate.

In at least some embodiments the step of identifying the feedback signal includes identifying the stationary two phase negative sequence components of the high frequency stator winding current. Here the high frequency signal is characterized by a high frequency phase angle and the step of identifying the stationary two phase negative sequence components of the high frequency stator winding current may include the steps sensing two of the three-phase currents from the stator windings, converting the two three-phase currents to synchronous two phase currents using the high frequency phase angle, filtering the synchronous currents to generate intermediate synchronous two phase negative-sequence components and converting the intermediate components to stationary two phase negative sequence components using the high frequency angle. The filtering step may be either a high or low pass filtering step.

In some embodiments the step of identifying a low frequency spectrum includes converting the stationary components to synchronous two phase negative sequence components using a high frequency angle estimate, subtracting one of the synchronous negative sequence components from a DC value to generate a difference value and stepping up the difference value to generate the low frequency spectrum. Here, the angle estimate may be determined by adding the low frequency spectrum and the high frequency to generate a combined frequency spectrum and integrating the combined frequency spectrum.

The method may also include the step of identifying the system specific dominant harmonic number during a commissioning procedure and storing the dominant harmonic number for subsequent use.

In other embodiments the step of identifying the feedback signal includes identifying one of a high frequency zero sequence voltage component and a high frequency zero sequence current component as a first of the two phase components, integrating the first component to generate an integrated signal, low pass filtering the integrated signal to generate a low frequency component and subtracting the low frequency component from the integrated signal to generate the second of the two phase components.

The invention also includes an apparatus to be used with the aforementioned methods and, to that end, includes an apparatus for determining a stator fundamental operating frequency in a three phase induction machine where the machine is characterized by a system specific dominant harmonic frequency number. Here, the apparatus comprises a generator for injecting a high frequency voltage signal having a high frequency into the machine thereby generating a high frequency current within the stator windings, a module for identifying stationary two phase high frequency feedback signal components that includes stator field position information, a module for identifying a low frequency spectrum corresponding to the feedback signal components, a module for mathematically combining the low frequency spectrum and the system specific dominant harmonic number to generate a stator fundamental frequency estimate.

The module for identifying the feedback signal may include a module for identifying the stationary two phase negative sequence components of the high frequency stator winding current. Here, the high frequency signal is characterized by a high frequency phase angle and the module for identifying the stationary two phase negative sequence components of the high frequency stator winding current may include a sensor for sensing at least two of the three-phase currents from the stator windings, a converter for converting the three-phase currents to synchronous two phase currents using the high frequency phase angle, a filter for filtering the synchronous currents to generate intermediate synchronous two phase negative-sequence components and a converter for converting the intermediate components to stationary two phase negative sequence components using the high frequency angle.

The module for identifying a low frequency spectrum in some embodiments includes a converter for converting the stationary components to synchronous two phase negative sequence components using a high frequency angle estimate, a summer for subtracting one of the synchronous negative sequence components from a DC value to generate a difference value and a controller for stepping up the difference value to generate the low frequency spectrum. The apparatus may further include a summer for adding the low frequency spectrum and the high frequency to generate a combined frequency spectrum and an integrator for integrating the combined spectrum to generate the angle estimate.

In other embodiments the module for identifying the feedback signal includes a module for identifying one of a high frequency zero sequence voltage component and a high frequency zero sequence current component as a first of the two phase components, an integrator for integrating the first component to generate an integrated signal, a low pass filter for filtering the integrated signal to generate a low frequency component and a summer for subtracting the low frequency component from the integrated signal to generate the second of the two phase components.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 1 is a schematic view in cross section of an induction motor showing instantaneous locations of a rotor flux, a stator mmf and the torque and flux components of the stator mmf;

FIGS. 2a and 2b are related graphs where FIG. 2a illustrates an exemplary high frequency angle and FIG. 2b illustrates corresponding high frequency zero sequence voltage and flux signals;

DETAILED DESCRIPTION OF THE INVENTION

Figure 3:
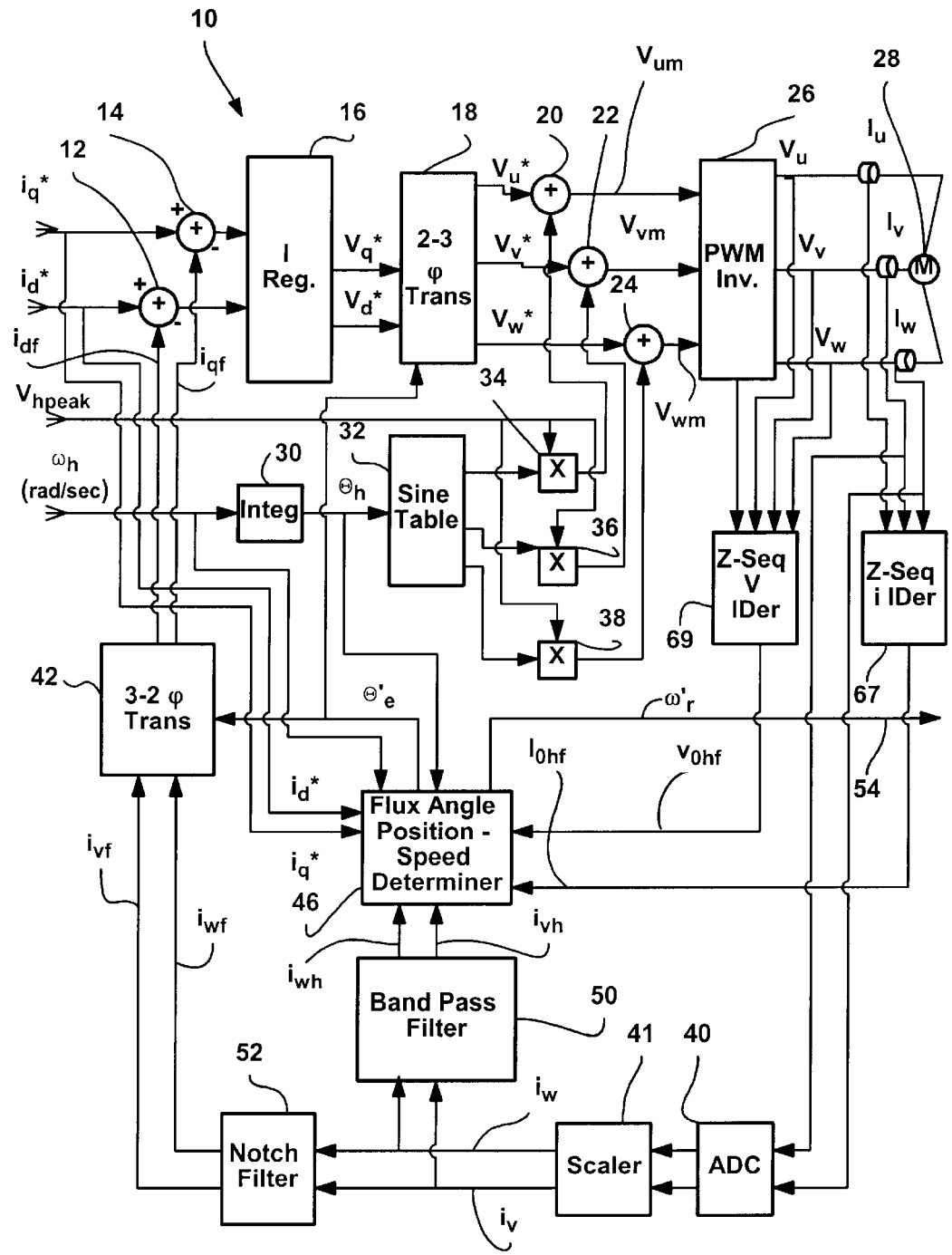
FIG. 3 is a schematic diagram of a motor control system according to the present invention.

In the description that follows, an "*" superscript denotes a command signal, an "f" subscript denotes a feedback signal, an "h" subscript denotes a high frequency signal, an "i" denotes that a corresponding signal relates to a current signal, a "V" denotes that a signal relates to a voltage signal, an "r" subscript denotes a signal relates to a motor rotor, an "s" subscript denotes a signal relates to a motor stator, a "d" subscript denotes that a signal corresponds to a synchronous d-axis, a "q" subscript denotes that a signal corresponds to a synchronous q-axis, "u", "v" and "w" subscripts denote that corresponding signals relate to each of first, second and third system phases, an "n" subscript denotes that a signal is a negative sequence signal, a "0" subscript denotes that a signal is a zero sequence signal, an "α" subscript denotes a stationary α-axis signal and a "β" subscript denotes a stationary β-axis signal.

While the following description details various blocks, steps, and functions, it should be remembered that all of these elements are meant to be implemented in software as computer programs and represent algorithms for execution by a conventional-type digital processor adapted for industrial applications.

Referring now to the drawings wherein like reference characters represent similar elements and signals throughout the several views and, more specifically, a referring to FIG. 3, the present invention will be described in the context of an exemplary motor control system 10 including a plurality of summers 12, 14, 20, 22 and 24, a plurality of multipliers 34, 36 and 38, a current regulator 16, a 2-3 phase and synchronous to stationary frame transformer 18, a PWM inverter 26, a three phase motor 28, an integrator 30, a sign table 32, an A-D converter 40, a 3-2 phase and stationary to synchronous frame transformer 42, a flux angle position-speed determiner 46, a scalar 41 and at least one notch filter 52. In addition, depending on the system configuration employed, the system may further include one of a voltage zero sequence determiner 69, a current zero sequence determiner 67 and a band pass filter 50. A first embodiment of the invention to be described includes bandpass filter 50 and does not include identifiers 69 and 67. Subsequently described embodiments include one of identifiers 67 and 69.

Generally, system 10 receives two phase current command signals $i^*_q$ and $i^*_d$ and, based thereon, generates three phase voltages on motor supply lines linked to motor 28 to drive motor 28 in a desired fashion. The three phase voltages $V^*_u$, $V^*_v$ and $V^*_w$ together generate currents within each of the three motor phases. At least two of the three phase currents are sensed using hall effect sensors or some other suitable sensors (not numbered) and are provided as feedback currents to a feedback loop that is provided to eliminate the difference between the command currents $i^*_q$ and $i^*_d$ and the resulting currents delivered to motor 28.

Command currents $i^*_q$ and $i^*_d$ are provided to summers 14 and 12, respectively. The three phase motor currents are converted in a manner which will be described in more detail below to two phase d and q access feedback currents $i_{df}$ and $i_{qf}$, respectively, the two phase feedback currents $i_{df}$ and $i_{qf}$ being provided to summers 12 and 14, respectively. Summer 12 subtracts the d-axis feedback current $i_{df}$ from the d-axis command current $i^*_d$ to generate a d-axis error signal, which is provided to regulator 16. Similarly, summer 14 subtracts the q-axis feedback current $i_{qf}$ from the q-axis command current $i^*_q$ to generate an error signal, which is provided to regulator 16. Regulator 16 converts the current error signals to command voltage signals $V^*_q$ and $V^*_d$, which are provided to 2-3 phase and synchronous to stationary frame transformer 18.

Transformer 18 receives an electrical phase angle $\Theta_e$ from determiner 46 and, using the received angle, coverts the command voltages $V^*_q$ and $V^*_d$ to three phase command voltages $V^*_u$, $V^*_v$ and $V^*_w$. The three phase command voltages are provided to summers 20, 22 and 24, respectively. Each of summers 20, 22 and 24 also receives a high frequency injection voltage signal. Generation of the high frequency injection voltage signals is described in more detail below. Summer 20 adds the received signals (i.e., command signal $V^*_u$ and the high frequency injection voltage signal) and generates a modified single-phase voltage signal $V_{um}$, which is provided to inverter 26. Similarly, each of summers 22 and 24 adds their respective received signals and provides an output modified voltage signal $V_{vm}$ and $V_{wm}$, respectively, to inverter 26. Inverter 26 uses the modified voltage signals $V_{um}$, $V_{vm}$ and $V_{wm}$ to generate the three phase voltages $V_v$, $V_u$ and $V_w$ on the motor supply lines.

Referring still to FIG. 3, in addition to command currents $i^*_q$ and $i^*_d$, two other values are provided as inputs to system 10 and are specifically used to generate the high frequency injection voltage signals that are added to the three phase command voltages $V^*_u$, $V^*_v$ and $V^*_w$ via summers, 20, 22 and 24. Specifically, a peak high frequency magnitude signal $V_{hpeak}$ and a high frequency signal $\omega_h$ are provided. High frequency signal $\omega_h$ is provided to determiner 46 and to integrator 30, which integrates the received signal and provides a high frequency angle signal $\Theta_h$ to sine table 32. Sine table 32 has first, second and third outputs which are linked to multipliers 34, 36 and 38, respectively. On the first output (i.e., the output linked to multiplier 34), sine table 32 provides the sine of high frequency angle $\Theta_h$. On the second output (i.e., the output linked to multiplier 36), sine table 32 provides the sine of $(\Theta_h+2\pi/3)$. On the third output (i.e., the output linked to multiplier 38), sine table 32 provides the sine of $(\Theta_h +4\pi/3)$. Thus, sine table 32 generates three outputs where the outputs are the sines of angles that are separated by 120°.

The peak high frequency amplitude signal $V_{hpeak}$ is also provided to each of multipliers 34, 36 and 38. Multiplier 34 multiplies its received signals to generate the high frequency injection voltage signal provided to summer 20. Similarly, each of multipliers 36 and 38 multiplies their respective received signals together to generate high frequency injection signals that are provided to summers 22 and 24, respectively. As indicated above, summers 20, 22 and 24 add the high frequency signals to the three phase command signals $V^*_u$, $V^*_v$ and $V^*_w$ to generate the modified voltages $V_{um}$, $V_{vm}$ and $V_{wm}$ to drive inverter 26.

Referring still to FIG. 3, the feedback currents from the two of the three motor phases are provided to the analog to digital converter 40 and scalar 41 which convert the received signals to digital signals and step up the signals where appropriate by a scalar number. Scalar 41 provides current feedback signals $i_v$ and $i_w$ to notch filter 52. In addition, in the first embodiment of the invention (e.g., the embodiment including bandpass filter 50), scalar 41 provides the feedback current signals to bandpass filter 50. Band pass filter 50 passes only the high frequency feedback components $i_{vhf}$ and $i_{whf}$ to flux angle position/speed determiner 46

Notch filter 52 provides three-phase feedback currents $i_{vf}$ and $i_{wf}$ including components only within a specific notch range. More specifically, the notch range will typically exclude the high frequency $\omega_h$ provided to integrator 30. In this manner, the injected high frequency currents should be filtered out and should not directly effect the comparison of command and feedback currents by summers 12 and 14.

The three phase currents output by notch filter 52 are provided to the three to two phase and stationary to synchronous frame transformer 42. As well known in the controls art, any two phases of the three are enough for the three to two phase conversion and therefore, transformer 42 uses any two of the three phase feedback currents (e.g., $i_{uf}$ and $i_{wf}$) and electrical angle $\Theta'_e$ provided by position-speed determiner 46 to generate the d and q-axis feedback currents $i_{df}$ and $i_{qf}$, respectively. As described above, the d and q-axis feed back currents $i_{df}$ and $i_{qf}$, respectively, are provided to summers 12 and 14 and are subtracted from corresponding command current signals $I'_q$ and $i'_d$.

Figure 4:
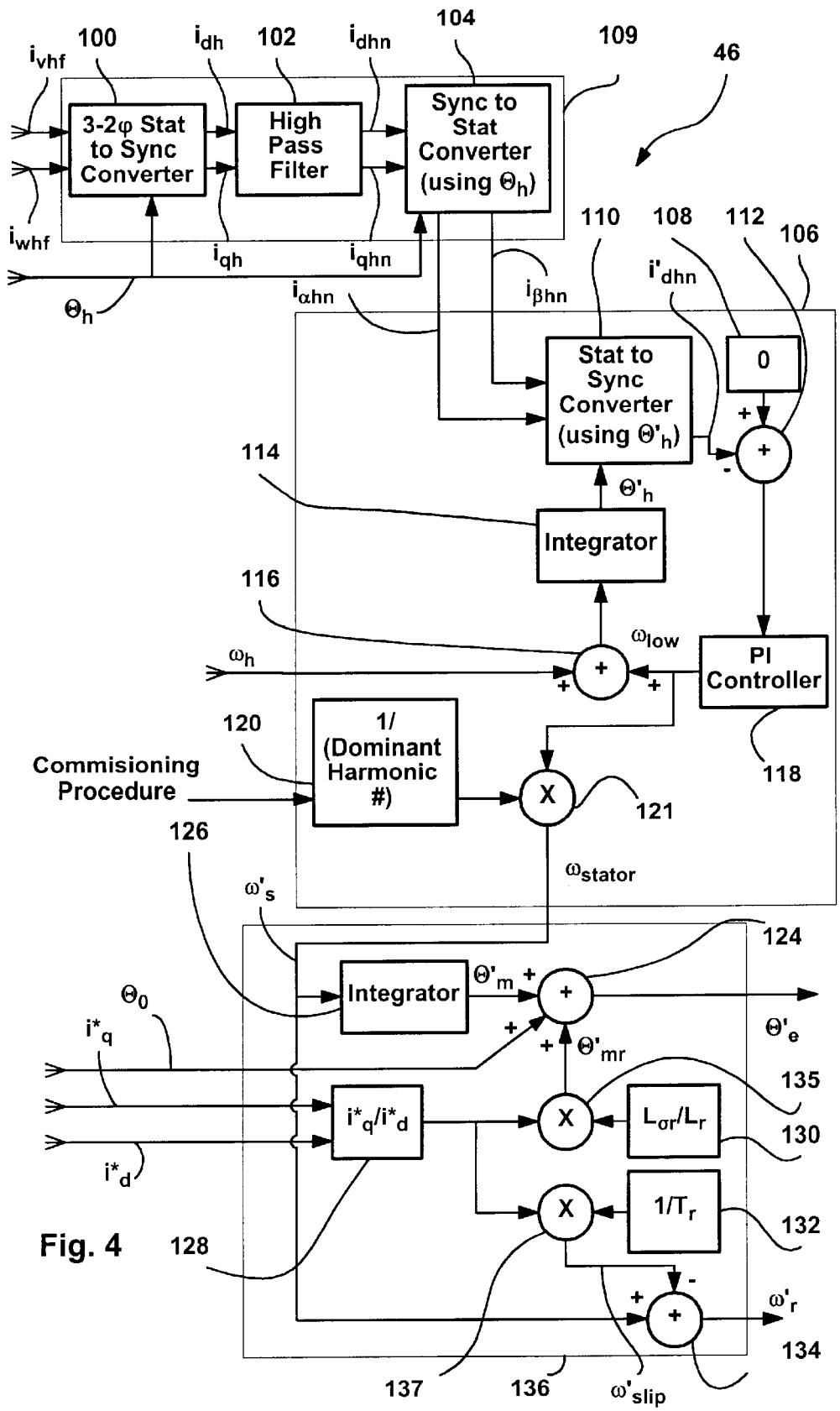
FIG. 4 is a schematic illustrating one embodiment of the flux angle and position determiner of FIG. 3.

Referring now to FIGS. 3 and 4, position-speed determiner 46 includes a plurality of components arranges to generally form three separate sub-assemblies including a filter module 109, a stator frequency module 106 and a process module 136. filter module 109 includes a stationary to synchronous converter 100, a high pass filter 102 and a synchronous to stationary converter 104. The stationary to synchronous converter 100 receives the two three-phase feedback currents $i_{vhf}$ and $i_{whf}$ from filter 50 and converts those currents to intermediate two-phase synchronous currents $i_{dh}$ and $i_{qh}$ using the high frequency angle $\Theta_h$. The intermediate currents $i_{dh}$ and $i_{qh}$, consistent with the meaning of synchronous, rotate at the phase angle $\Theta_h$. Intermediate currents $i_{dh}$ and $i_{qh}$ are provided to the high pass filter 102.

The stationary to synchronous converter 100 generates a DC positive-sequence signal component and a negative-sequence component having a frequency twice as large as the stationary frequency. Therefore, the positive-sequence component is filtered out by the high pass filter 102 and filter 102 generates synchronous d and q-axis negative sequence components $i_{dhn}$ and $i_{qhn}$, respectively. Synchronous to stationary converter 104 receives the negative-sequence components $i_{dhn}$ and $i_{qhn}$ and also receives high frequency angle $\Theta_h$ and uses angle $\Theta_h$ to convert the negative-sequence components $i_{dhn}$ and $i_{qhn}$ to stationary $\alpha$ and $\beta$-axis negative sequence components $i_{\alpha hn}$ and $i_{\beta hn}$. Stationary components $i_{\alpha hn}$ and $i_{\beta hn}$ are AC signals and includes components that correspond to the current frequency spectrum including the saliencies that occur as a result of interaction between the fundamental stator flux field and the high frequency injected voltage signal. Components $i_{\alpha hn}$ and $i_{\beta hn}$ are provided to frequency module 106.

Module 106 includes a stationary to synchronous converter 110, a memory location 108, first and second summers 112 and 116, an integrator 114, a PI controller 118, a second memory location 120 and a multiplier 121. The stationary negative-sequence current components $i_{\alpha hn}$ and $i_{\beta hn}$ are provided to the stationary to synchronous converter 110. Converter 110 also receives a high frequency angle estimate $\Theta'_h$ from integrator 114 and uses the angle estimate $\Theta'_h$ to convert the stationary components $i_{\alpha hn}$ and $i_{\beta hn}$ to synchronous high frequency d and q-axes negative sequence current components (only d-axis component $i'_{dhn}$ shown). In the illustrated embodiment, the d-axis synchronous component $i'_{dhn}$ is provided to summer 112. It should be appreciated that, instead of employing the d-axis component $i'_{dhn}$, the q-axis component (not illustrated) maybe provided to summer 112.

Summer 112 also receives a DC value from memory location 108. In the illustrated example, the DC value is zero. As illustrated, summer 112 subtracts the synchronous d-axis component $i'_{dhn}$ from the zero value and provides its output as a difference value to PI controller 118. As well known in the art, PI controller 118 steps up the difference value and provides a stepped up output.

In the present configuration, the stepped up output is the low frequency spectrum $\omega_{low}$. The low frequency spectrum $\omega_{low}$ is provided to summer 116 which also receives the high frequency signal $\omega_h$. Summer 116 adds the low frequency spectrum $\omega_{low}$ and the high frequency signal $\omega_h$ and provides its output as a combined frequency spectrum to integrator 114. Integrator 114 integrates the combined spectrum to generate the high frequency angle estimate $\Theta'_h$ which is in turn provided the stationary to synchronous converter 110. Referring still to FIG. 4, the low frequency spectrum signal $\omega_{low}$ is also provided to multiplier 121.

Referring still to FIGS. 3 and 4, during a commissioning procedure, prior to operating the system illustrated in FIGS. 3 and 4, a FFT analysis or a spectrum analyzer can be used to identify a system specific DHN. Exemplary and common dominant harmonic numbers may be in the range of the first or fundamental harmonic, the second harmonic, the fourth harmonic, the sixth harmonic, etc. The DHN is stored in memory location 120 and is used during subsequent motor operation.

Multiplier 121 divides low frequency spectrum signal $\omega_{low}$ by the system specific DHN which is stored in memory location 120 to generate a modified frequency spectrum $\omega_{mod}$. The modified spectrum $\omega_{mod}$ is then filtered (e.g., averaged) by filter 119 thereby generating the stator frequency estimate $\omega'_s$ which is provided to module 136. Multiplier 121 divides low frequency spectrum signal $\omega_{low}$ by the system specific DHN which is stored in memory location 120 to generate the stator frequency estimate $\omega'_s$ which is provided to module 136.

Module 136 includes an integrator 126, first and second summers 124 and 134, a divider 128, first and second multipliers 135 and 137 and first and second memory locations 130 and 132, respectively. Integrator 126 receives the estimated stator frequency $\omega'_s$ and integrates the estimated stator frequency signal $\omega'_s$ to generate an air gap flux angle estimate $\Theta'_m$. Divider 128 receives the d and q-axis command signals $i^*_d$, $i^*_q$ and divides the q-axis command signal $i^*_q$ by the d-axis command signal $i^*_d$ providing an output signal to multiplier 135.

In addition to identifying and storing the system specific DHN during the commissioning procedure, other system parameters and combinations of parameters may be determined and stored in memory locations 130 and 132. For instance, a rotor leakage inductance $L_{\rho r}$, a rotor inductance value $L_r$ and a rated torque value $T_r$ are identified. The rotor leakage inductance $L_{\rho r}$ is divided by the rotor inductance $L_r$ and the resulting value is stored in memory location 130. The torque value $T_r$ is inverted and the inverted value is stored in memory location 132.

Referring still to FIG. 4, multiplier 135 multiplies the output signal received from divider 128 by the value in memory location 130 to generate an angle estimate $\Theta'_{mr}$ which corresponds to an estimated angle between the rotor flux and air gap flux in the system. The estimated angle $\Theta'_{mr}$ is provided to summer 124. In addition to receiving estimated angles $\Theta'_m$ and $\Theta'_{mr}$, summer 124 also receives an initial angle value $\Theta_0$. Summer 124 adds all three of the received signals to generate a rotor flux angle estimate $\Theta'_e$. As seen in FIG. 3, angle $\Theta'_e$ is provided to various transformers (e.g., 18, 42, etc.) within the larger control system for performing 2-to-3 and 3-to-2 transformations.

Referring yet again to FIG. 4, the output of divider 128 is also provided to multiplier 137 which multiplies the output signal from divider 128 by the content of memory location 132 to generate a slip frequency estimate $\omega'_{slip}$. Summer 134 subtracts the slip estimate $\omega'_{slip}$ from the stator frequency estimate $\omega'_s$ thereby generating a rotor speed estimate $\omega'_r$. Referring again to FIG. 3, rotor speed estimate $\omega'_r$ is provided as an output of determiner 46.

Figure 5:
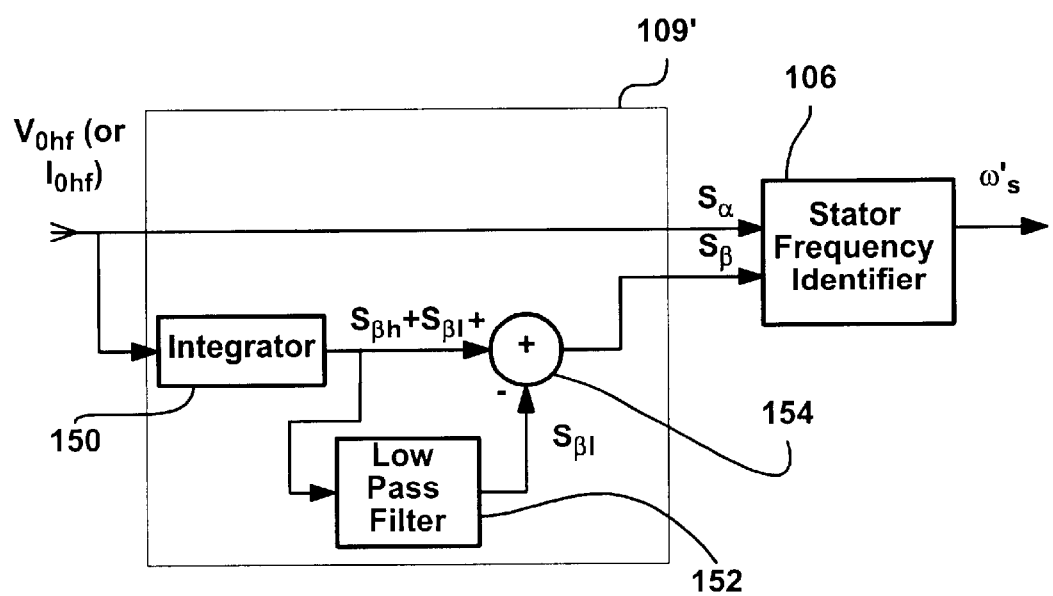
FIG. 5 is similar to FIG. 4, albeit of a second embodiment of the determiner identifier of FIG. 3.

Referring now to FIG. 5, a second embodiment of the filter module 109 in FIG. 4 is illustrated. Because the embodiment in FIG. 5 performs a similar function to the filter embodiment 109 in FIG. 4, the embodiment of FIG. 5 is identified by the same numeral 109. However, to distinguish the embodiment of FIG. 5 from the embodiment of FIG. 4, the number 109 in FIG. 5 is followed by a"'".

Referring also to FIG. 3, this second embodiment includes the zero sequence voltage identifier 69 and would not include either of the bandpass filter 50 or identifier 67. Identifier 69 receives voltage feedback signals from all three of the motor phases and is also linked to a neutral point of inverter 26. Identifier 69 includes a bandpass filter to generate the high frequency portion of voltage zero sequence. Operation of identifiers like identifier 69 is well known in the art and therefore will not be explained here in detail. Suffice it to say here that identifier 69 generates zero sequence high frequency voltage signal $V_{ohf}$ that is provided to determiner 46.

Referring still to FIG. 5, module 109' receives the zero sequence signal $V_{ohf}$ and uses the received signal $V_{ohf}$ to generate stationary high frequency quadrature $\alpha$ and $\beta$-axis signals identified as $S_{\alpha h}$ and $S_{\beta h}$ signals, respectively, where the quadrature signals $S_{\alpha h}$ and $S_{\beta h}$ include the frequency spectrum corresponding to the overall system illustrated in FIG. 3.

As illustrated, the high frequency zero sequence feedback voltage $V_{ohf}$ is directly provided as the $\alpha$-axis signal $S_\alpha$. To generate the $\beta$-axis signal $S_\beta$, module 109' includes an integrator 150, a summer 154 and a low pass filter 152. Integrator 150 receives the feedback signal $V_{ohf}$ and integrates that signal thereby providing an integrated signal including a high frequency component $S_{\beta h}$ and a low frequency component $S_{\beta l}$. The integrated signal $S_{\beta h}+S_{\beta l}$, is provided to low pass filter 152, which, as its label implies, low pass filters the signal so that its output comprises the low frequency component $S_{\beta l}$. Summer 154 receives the integrated signal $S_{\beta h}+S_{\beta l}$ and subtracts the low frequency component $S_{\beta l}$ therefrom thereby generating $S_\beta$ which includes the high frequency component $S_{\beta h}$. Signal $S_\beta$ is in quadrature with signal $S_\alpha$. Referring now to FIGS. 4 and 5, stationary quadrature signals $S_\alpha$ and $S_\beta$ are provided to stator frequency module 106 which operates in a manner described above to generate the stator frequency estimate $\omega'_s$.

Referring again to FIGS. 3, 4 and 5, in yet another embodiment of the invention, the system 10 would include zero sequence current identifier 67 and would not include identifier 69 or filter 50. In this case, identifier 67 provides a zero sequence high frequency feedback current $I_{ohf}$ instead of zero sequence voltage $V_{ohf}$ to module 109' in FIG. 5. Here module 109' operates in the fashion described above to generate signals $S_\alpha$, and $S_\beta$ that are provided to module 106.

Figure 6:
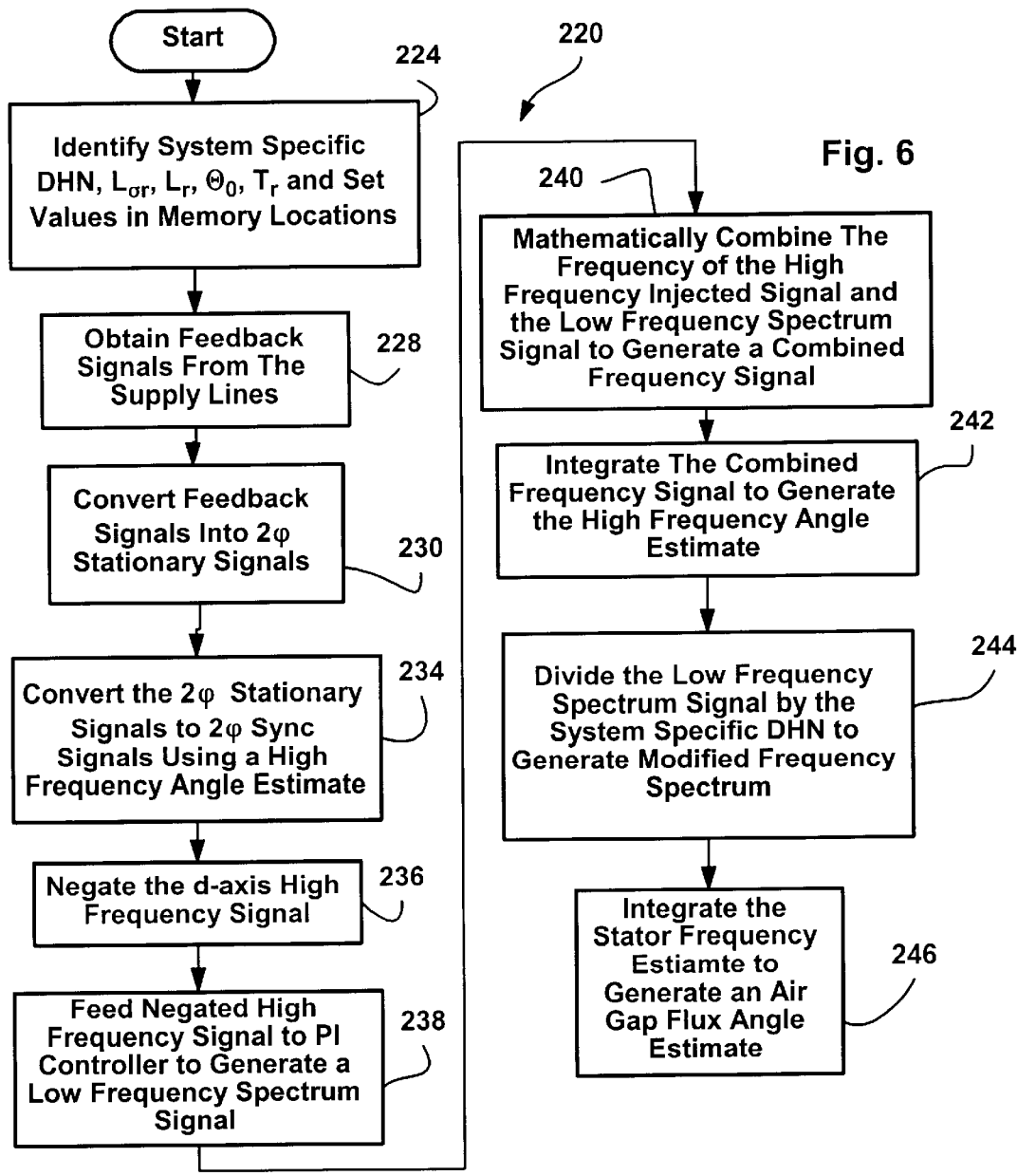
FIG. 6 is a flow chart illustrating one inventive method.

Referring now to FIG. 6, a flow chart 220, illustrating operation of the present invention is provided. Beginning at block 224, during the commissioning procedure, the system specific DHN is identified as well as the rotor leakage inductance $L_{\rho r}$, the rotor inductance $L_r$, the initial angle $\Theta_0$ and the rotor Time Constant $T_r$ and those values are stored in the memory locations described above (e.g., 108, 120, 130, 132, etc.). At block 128, feedback signals are obtained from the system supply lines. As described above, depending on which embodiment of the invention is configured, the feedback may include either a zero sequence high frequency voltage signal $V_{ohf}$, a zero sequence high frequency current signal $I_{ohf}$ or two of the three-phase current signals (i.e., $I_{wh}$ and $I_{vh}$).

At block 230, the feedback signals are converted into high frequency two-phase stationary signals that include flux field position information. At block 234 the high frequency two-phase stationary signals are provided to the PLL (see 106 in FIG. 4) and the PLL converter 110 converts the stationary signals to two-phase synchronous signals using the high frequency angle estimate $\Theta'_h$. At block 236, either the d or q-axis high frequency signal is negated and then at block 238, the negated signal is provided to PI controller 118 which steps up the received signal thereby generating a low frequency spectrum signal $\omega_{low}$.

Continuing, at block 240 summer 116 adds the high frequency injection signal $\omega_h$ and the low frequency spectrum signal $\omega_{low}$ to provide the combined frequency signal. At block 242 integrator 114 integrates the combined frequency signal to generate the high frequency angle estimate $\Theta'_h$ which is provided to converter 110 thereby completing the PLL loop.

Referring still to FIG. 6 and also to FIG. 4, at block 244, multiplier 121 divides the low frequency spectrum signal $\omega_{low}$ by the system specific DHN thereby generating a stator frequency estimate $\omega'_s$. Finally, at block 246, the stator frequency estimate $\omega'_s$ is integrated to generate the air gap flux angle estimate $\Theta'_m$.

Figure 7:
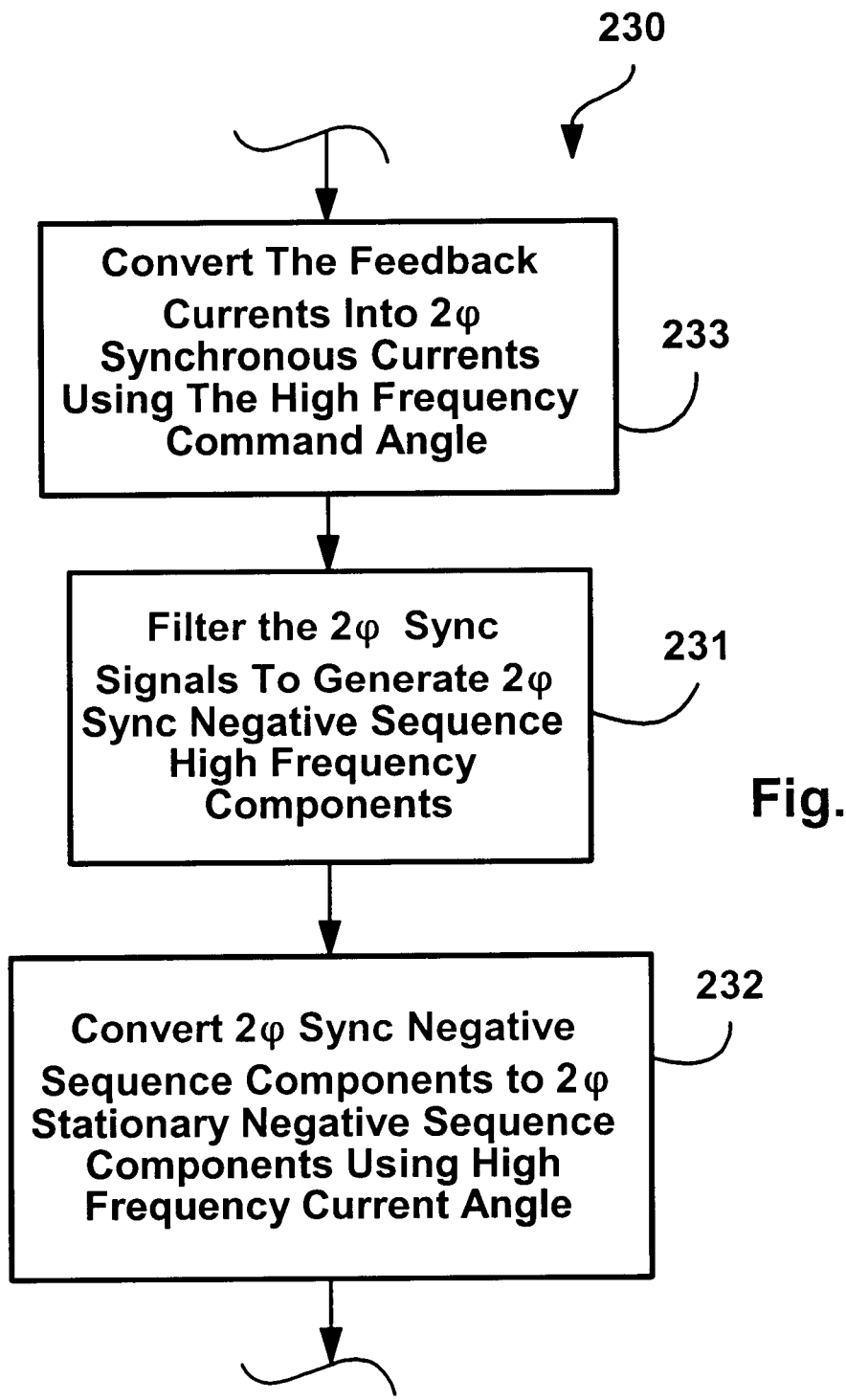
FIG. 7 is a flow chart illustrating one of the method steps of FIG. 6 in greater detail and corresponds to the configuration illustrated in FIG. 4.

Referring now to FIG. 7, the process step of block 230 in FIG. 6 corresponding to a system using two high frequency three-phase feedback signals is illustrated in greater detail. To this end, at block 233, referring also to FIG. 4, the two high frequency three-phase feedback currents are converted into two-phase quadrature synchronous currents $I_{dhf}$ and $I_{qhf}$ using the high frequency command angle $\Theta_h$. Next, at block 231, the two-phase synchronous current components $I_{dh}$ and $I_{qh}$ are filtered (e.g., either high or low pass filter depending upon how angle $\Theta_h$ was applied in step 233) to generate two-phase synchronous negative sequence high frequency components $I_{dhn}$ and $I_{qhn}$, respectively. At block 232, the two-phase synchronous negative sequence components are converted into two-phase stationary negative sequence components using the high frequency current angle $\Theta_h$.

Figure 8:
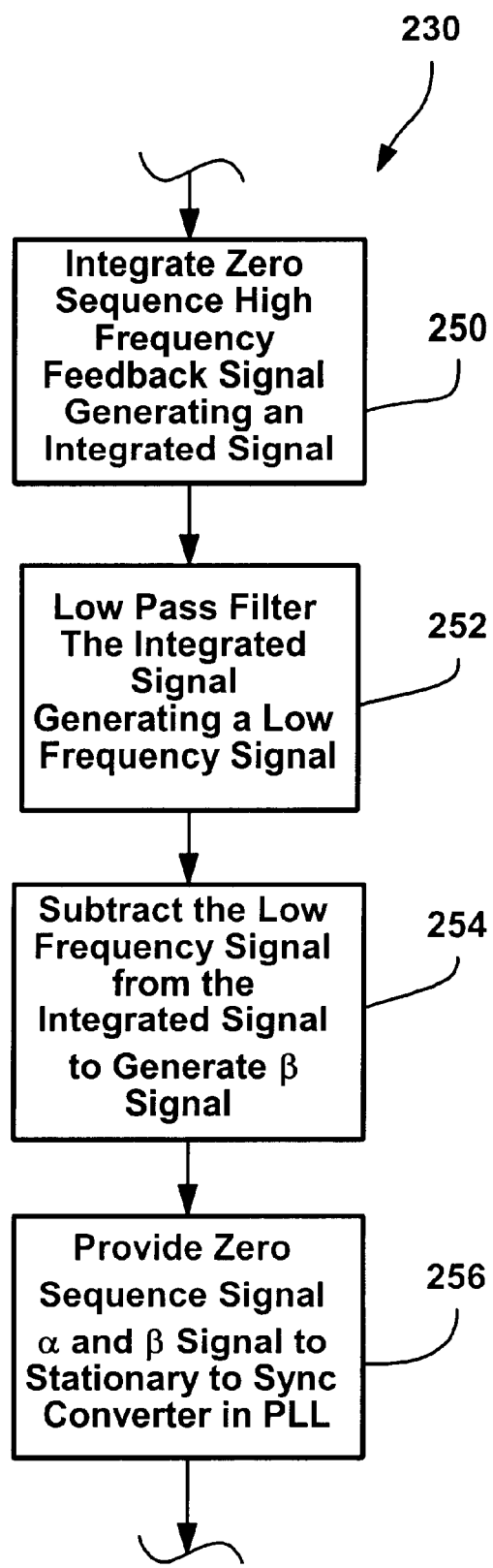
FIG. 8 is similar to FIG. 7 albeit corresponding to the embodiment illustrated in FIG. 5.
Figure 9:
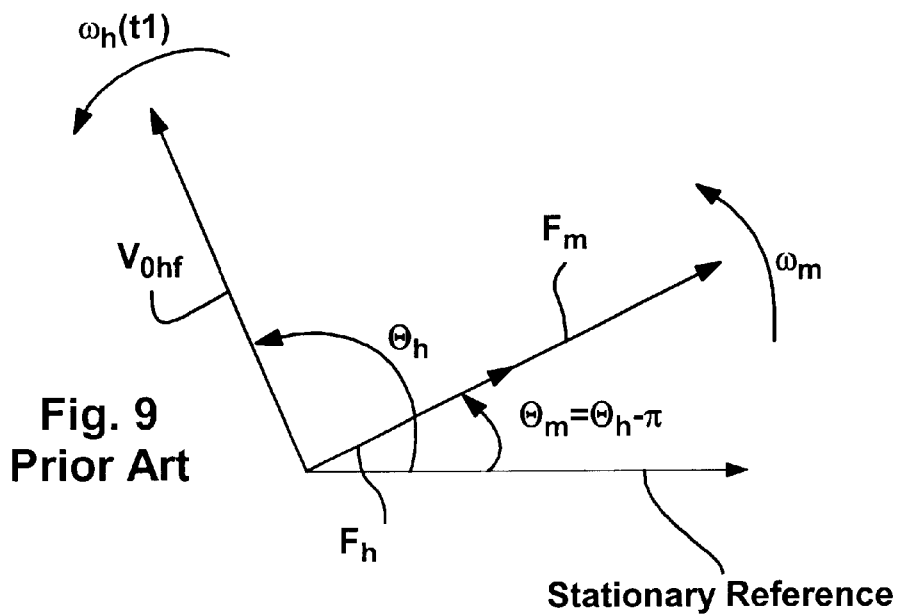
FIG. 9 is a phasor diagram illustrating the relationship between various system operating parameters in a system including a high frequency injection voltage.
Figure 10:
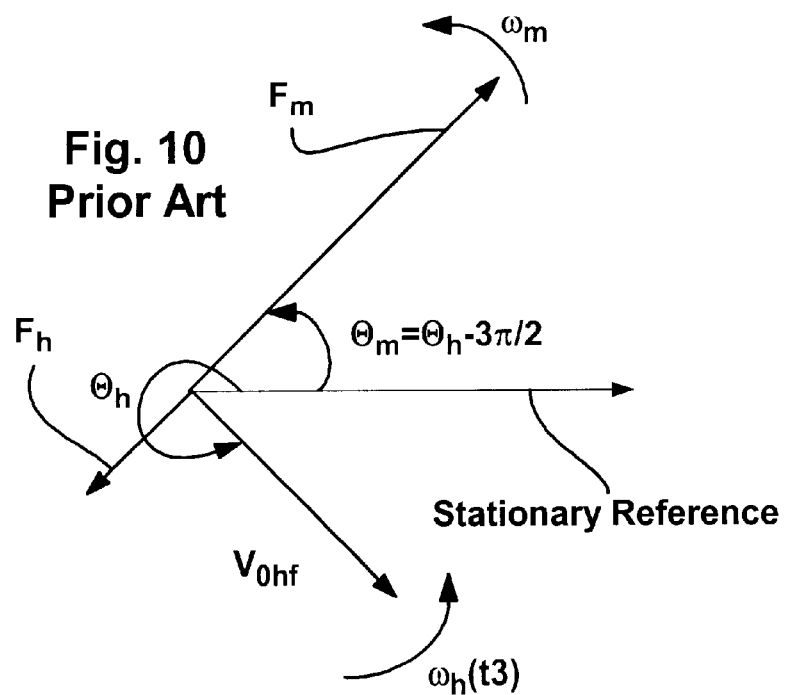
FIG. 10 is similar to FIG. 9 albeit at a different instant in time.

Referring now to FIG. 8, the process step 230 in FIG. 6 corresponding to a system that uses a zero sequence high frequency feedback signal is illustrated. To this end, referring also to FIG. 5, at block 250, integrator 150 integrates the zero sequence high frequency feedback signal to generate an integrated signal $S_{\beta h}+S_{\beta l}$. At block 252, the integrated signal is low pass filtered by filter 152 thereby generating a low frequency signal $S_{\beta l}$ which is provided to summer 154. At block 254, summer 154 subtracts the low frequency signal $S_{\beta l}$ from the integrated signal to generate the $S_\beta$ signal where the $S_\beta$ signal is in quadrature with the high frequency zero sequence feedback signal (e.g., $V_{ohf}$ or $I_{ohf}$). Continuing, at block 256, the zero sequence signal $S_\alpha$ and the $S_\beta$ signal are provided to the stationary-to-synchronous converter (e.g., see 110 in FIG. 4) in the PLL.

It should be understood that the methods and apparatuses described above are only exemplary and do not limit the scope of the invention, and that various modifications could be made by those skilled in the art that would fall under the scope of the invention.

To apprise the public of the scope of this invention, the following claims are made:

What is claimed is:

1. A method for determining a stator fundamental operating frequency in a three phase induction machine where the machine is characterized by a system specific dominant harmonic frequency number, the method comprising the steps of:

injecting a high frequency voltage signal having a high frequency into the machine thereby generating a high frequency current within the stator windings;

identifying stationary two phase high frequency feedback signal components that includes stator field position information;

identifying a low frequency spectrum corresponding to the feedback signal components;

mathematically combining the low frequency spectrum and the system specific dominant harmonic number to generate a stator fundamental frequency estimate.

2. The method of claim 1 wherein the step of identifying the feedback signal includes identifying the stationary two phase negative sequence components of the high frequency stator winding current.

3. The method of claim 2 wherein the high frequency signal is characterized by a high frequency phase angle and the step of identifying the stationary two phase negative sequence components of the high frequency stator winding current includes the steps sensing two of the three-phase currents from the stator windings, converting the two three-phase currents to synchronous two phase currents using the high frequency phase angle, filtering the synchronous currents to generate intermediate synchronous two phase negative-sequence components and converting the intermediate components to stationary two phase negative sequence components using the high frequency angle.

4. The method of claim 3 wherein the step of filtering the synchronous currents includes the step of high pass filtering.

5. The method of claim 3 wherein the step of filtering the synchronous currents includes the step of low pass filtering.

6. The method of claim 1 wherein the step of identifying a low frequency spectrum includes converting the stationary high frequency components to synchronous two phase high frequency negative sequence components using a high frequency angle estimate, subtracting one of the synchronous negative sequence components from a DC value to generate a difference value and stepping up the difference value to generate the low frequency spectrum.

7. The method of claim 6 wherein the angle estimate is determined by adding the low frequency spectrum and the high frequency to generate a combined frequency spectrum and integrating the combined frequency spectrum.

8. The method of claim 6 wherein the DC value is zero.

9. The method of claim 1 wherein the step of mathematically combining includes the step of dividing the low frequency spectrum by the system specific dominant harmonic number.

10. The method of claim 1 further including the step of identifying the system specific dominant harmonic number during a commissioning procedure and storing the dominant harmonic number for subsequent use.

11. The method of claim 1 wherein the step of identifying the feedback signal includes identifying one of a high frequency zero sequence voltage component and a high frequency zero sequence current component as a first of the two phase components, integrating the first component to generate an integrated signal, low pass filtering the integrated signal to generate a low frequency component and subtracting the low frequency component from the integrated signal to generate the second of the two phase components.

12. An apparatus for determining a stator fundamental operating frequency in a three phase induction machine where the machine is characterized by a system specific dominant harmonic frequency number, the apparatus comprising:
a generator for injecting a high frequency voltage signal having a high frequency into the machine thereby generating a high frequency current within the stator windings;
a module for identifying stationary two phase high frequency feedback signal components that includes stator field position information;
a module for identifying a low frequency spectrum corresponding to the feedback signal components; and
a module for mathematically combining the low frequency spectrum and the system specific dominant harmonic number to generate a stator fundamental frequency estimate.

13. The apparatus of claim 12 wherein the module for identifying the feedback signal includes a module for identifying the stationary two phase high frequency negative sequence components of the high frequency stator winding current.

14. The apparatus of claim 13 wherein the high frequency signal is characterized by a high frequency phase angle and the module for identifying the stationary two phase high frequency negative sequence components of the high frequency stator winding current includes a sensor for sensing at least two of the three-phase currents from the stator windings, a converter for converting the three-phase currents to synchronous two phase currents using the high frequency phase angle, a filter for filtering the synchronous currents to generate intermediate synchronous two phase high frequency negative-sequence components and a converter for converting the intermediate components to stationary two phase high frequency negative sequence components using the high frequency angle.

15. The apparatus of claim 14 wherein the filter for filtering the synchronous currents includes a high pass filter.

16. The apparatus of claim 14 wherein the filter for filtering the synchronous currents includes a low pass filter.

17. The apparatus of claim 12 wherein the module for identifying a low frequency spectrum includes a converter for converting the stationary components to synchronous two phase high frequency negative sequence components using a high frequency angle estimate, a summer for subtracting one of the synchronous negative sequence components from a DC value to generate a difference value and a controller for stepping up the difference value to generate the low frequency spectrum.

18. The apparatus of claim 17 further including a summer for adding the low frequency spectrum and the high frequency to generate a combined frequency spectrum and an integrator for integrating the combined spectrum to generate the angle estimate.

19. The apparatus of claim 17 wherein the DC value is zero.

20. The apparatus of claim 12 wherein the module for mathematically combining includes a multiplier for dividing the low frequency spectrum by the system specific dominant harmonic number.

21. The apparatus of claim 12 further including a module for identifying the system specific dominant harmonic number during a commissioning procedure and storing the dominant harmonic number for subsequent use.

22. The apparatus of claim 12 wherein the module for identifying the feedback signal includes a module for identifying one of a high frequency zero sequence voltage component and a high frequency zero sequence current component as a first of the two phase components, an integrator for integrating the first component to generate an integrated signal, a low pass filter for filtering the integrated signal to generate a low frequency component and a summer for subtracting the low frequency component from the integrated signal to generate the second of the two phase components.

* * * * *